United States Patent [19]

Mitra

[11] 4,073,670
[45] Feb. 14, 1978

[54] METHOD OF FORMING NARROW RIBBONS OF FIBERS IN PLASTIC MATERIAL

[75] Inventor: Panchanan Mitra, Stapleford, England

[73] Assignee: Ciba-Geigy Corporation, Ardsley, N.Y.

[21] Appl. No.: 742,308

[22] Filed: Nov. 16, 1976

[30] Foreign Application Priority Data

Nov. 27, 1975 United Kingdom ............... 48723/75

[51] Int. Cl.$^2$ ................................................ B32B 5/00
[52] U.S. Cl. .................................... 156/179; 156/234; 156/247; 156/296; 156/344
[58] Field of Search ............... 156/168, 176, 161, 178, 156/179, 180, 181, 247, 249, 234, 238, 242, 243, 246, 288, 290, 296, 297, 298, 299, 300, 344, 441, 336; 264/160, 161, 138

[56] References Cited

U.S. PATENT DOCUMENTS

| | | | |
|---|---|---|---|
| 2,954,815 | 10/1960 | Kuts | 156/161 |
| 3,475,264 | 10/1969 | Donaldson | 156/436 |
| 3,660,197 | 2/1972 | Morgan et al. | 156/178 |
| 3,700,511 | 10/1972 | Whitney et al. | 156/181 |
| 3,737,352 | 6/1973 | Avis et al. | 156/180 |
| 3,755,060 | 8/1973 | Bullock | 156/441 |
| 3,783,068 | 1/1974 | Brown | 156/173 |
| 3,862,287 | 1/1975 | Davies | 156/180 |

FOREIGN PATENT DOCUMENTS 1,296,740   6/1972   United Kingdom.

*Primary Examiner*—Charles E. Van Horn
*Assistant Examiner*—Michael W. Ball
*Attorney, Agent, or Firm*—Luther A. R. Hall

[57] ABSTRACT

A method of preparing narrow ribbons of unidirectional, fiber-reinforced plastic material, particularly suitable for filament winding operations, involves using a series of spaced discrete parallel strips of fibers and a plastics film, heating under pressure, and removing surplus plastics material from between each strip by application and removal of a continuous sheet.

12 Claims, No Drawings

METHOD OF FORMING NARROW RIBBONS OF FIBERS IN PLASTIC MATERIAL

BACKGROUND OF THE INVENTION

This invention relates to a method for the production of ribbons, suitable for use in filament winding, from a plastics material in film form and unidirectional fibrous (including filamentary) reinforcing materials, to the ribbons so obtained, and to the filament windings made therefrom.

The process of filament winding is commonly carried out using filaments or ribbons of unidirectional fiber which are impregnated with a solid or semi-solid, but still curable, resin composition. Impregnation of such fibres is usually carried out by immersing bundles of them in a tank of a liquid resin composition followed by evaporation of solvent and/or heating to solidify the resin composition. However, certain fibrous materials, especially carbon fibres, cannot be satisfactorily impregnated in this way because the amount of resin composition which they pick up depends on the looseness of the bundle of fibres. Since this can vary between different parts of the same tow, pick-up of a controlled amount of liquid resin composition is impracticable. To overcome this difficulty methods have been devised whereby impregnation is effected using a solid film of a curable resin composition, which is applied to one or both sides of the fibres and the resin-fibre "sandwich" is heated under pressure so that the resin composition flows about the fibres to form a prepreg with controlled resin distribution. Such processes are described in British patent specifications Nos. 1,299,177 and 1,257,482.

These methods are perfectly satisfactory when a comparatively wide tape is required, but if a thin ribbon is required, such as from a single tow of fibres, the process is often too slow to be of practical use. Attempts have been made to overcome this difficulty by preparing a sheet of composite of normal width and slitting it into thin ribbons. If such a method is used, however, it is inevitable that some fibres on the edge of each ribbon are cut. The advantages gained by using continuous lengths of reinforcement are thereby lessened.

DETAILED DISCLOSURE

We have now found that these difficulties may be overcome by laying the reinforcing fibres in a series of separate strips, applying a plastics material, then removing excess of plastics material which is between the strips by applying a sheet of material to which the adhesive becomes fixed, and then removing this sheet of material.

Accordingly, this invention provides a method of preparing ribbons of unidirectional fibre-reinforced plastics material comprising the steps of 1. laying unidirectional fibres in a series of spaced discrete parallel strips onto a plastics material on a backing comprising a first continuous sheet of release material,
2. applying to the fibres a second continuous sheet of release material, which may be coated on the side which contacts the fibres with the same or a different plastics material,
3. applying heat and pressure such that the plastics materials or both plastics materials flow about the fibres to form a series of coherent strips,
4. removing only one of the layers of release material,
5. applying a continuous solid sheet which will adhere to surplus plastics material between each coherent strip, and
6. removing the said continuous solid sheet with the surplus plastics material adhering thereto.

The plastics material onto which the fibres are laid may be in the form of strips, each strip being wider than the strips of fibres which are laid thereon, or, preferably, the plastics material is in the form of a continuous sheet, covering the surface of the release material. The reinforcing fibres may be metallic or non-metallic, natural or synthetic. Suitable such materials include steel, cotton, rayon, polyester, silk, jute, boron, and, more particularly, carbon, glass, or an aromatic polyamide.

The plastics material or materials may contain a single thermosettable resin, such as an epoxide resin (i.e., a substance containing on average more than one 1,2-epoxide group per molecule) or a resole formed from a phenol such as phenol itself and an aldehyde such as formaldehyde; or it may contain a mixture of thermosettable resins. Thermosetting compositions will further include a curing agent. The plastics material or materials may also consist of, or contain as a mixture with a thermosettable resin, one or more thermoplastics substances which are not heat-curable. Examples of such mixtures are resoles with, as the thermoplastics component, a poly(vinyl acetal) or a nylon; a novolac formed from a phenol such as phenol itself and formaldehyde or other aldehyde, with, as the thermoplastics component, a neoprene rubber or acrylonitrile rubber; and epoxide resins, with, as the thermoplastics component, either a phenoxy resin (i.e., a polyarylene polyhydroxy polyether, substantially free from 1,2-epoxide groups, being a copolymer of a dihydric phenol with either a diglycidyl ether of a dihydric phenol or with epichlorohydrin and containing recurring units represented by the formula $-OROCH_2CH(OH)CH_2-$, where R denotes an arylene group) or a copolymer of an $\alpha$-olefin hydrocarbon with an $\alpha$-olefin which is an ester of a carboxylic acid. A polysulphone (a substance containing recurring units represented by the formula $-RSO_2-$, where R has the meaning previously assigned) can be used with or without an epoxide resin. These compositions are, in general, well known, and may be made into film adhesives in a conventional manner.

The plastics material may be prepared on a strippable backing of any conventional release material, polyethylene, polypropylene, and (cellulosic) paper treated with a release agent being preferred, as also they are as the second continuous sheet of release material.

The continuous solid sheet which is used to remove the surplus plastics material may be made of any substance to which the plastics material will adhere. Such a substance may be natural or synthetic, woven or non-woven, typically cotton cloth, nylon, polyester, untreated (cellulosic) paper (i.e., paper which has not been treated with a release agent), glan cloth aluminium foil, and especially poly(vinylidene chloride). The amount of fibres laid down to form each strip, and the pressure applied during the impregnation stage, control the final width and thickness of the ribbons. Preferably, one to ten tows, each comprising 1000 to 20,000 fibres, are laid to form each strip, and a pressure of about 150 to 1000, especially 300 to 600 kPa, usually in a press, is applied to give a final ribbon width of 3 to 30 mm having a thickness of 0.025 to 0.4 mm.

One (either) of the layers of release material is then removed.

Pressure between the impregnated strips and the adherent sheet is usually effected by means of rollers. In order to ensure an even pressure on the surplus plastics material lying between the layers of fibre it is preferred to use resilient rollers, such as those of rubber or similar resilient material. If desired, however, rollers having grooves to fit the contours of the impregnated strips on the backing sheet may be used. The pressure required to cause the sheet to adhere to the surplus plastics material is less than that required to form the impregnated strips; generally a pressure of 10 to 250, especially 150 to 200, kPa is sufficient.

The following Examples illustrate the invention. All parts are by weight.

The materials used were as follows:

"Epoxide resin A" denotes a polyglycidyl ether prepared in a known manner from 2,2-bis(4-hydroxyphenyl)propane and epichlorohydrin in the presence of alkali, having an epoxide content in the range 5.0 – 5.2 equiv./kg and a viscosity at 21° C in the range 20 – 40 Pas.

"Epoxide resin B" denotes a polyglycidyl ether prepared in a known manner by reaction of 2,2-bis(4-hydroxyphenyl)propane with epichlorohydrin in the presence of alkali. It had a 1,2-epoxide content in the range 0.25 to 0.42 equiv./kg and a Durrans softening point of 145° to 155° C.

"Polysulphone A" denotes a material available from Union Carbide Corporation under the designation Polysulphone P1700; according to the manufacturer, it melted in the range 350° to 360° C, its heat deflection temperature (ASTM Specification D648) was 175° C, and it contained, per average molecule, 50 to 80 repeating units of the formula

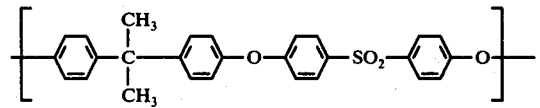

EXAMPLE 1

A mixture of Epoxide resin A (100 parts), Polysulphone A (70 parts), and boron trifluoride-monoethylamine complex (5 ) was dissolved in methylene chloride (120 parts), and the solution was poured onto a 400 mm wide strip of release paper and heated in an oven to remove the solvent. The film remaining was 0.025 mm thick.

One such supported film was laid, resin side uppermost, onto a flat surface, and groups of 4 tows of carbon fibres, each tow comprising approximately 3000 fibres, were laid unidirectionally on top of the resin. Each group of tows was separated by a distance of about 30 mm from the next group. When the resin surface had beem covered in this manner a second such supported film of resin was laid on top, the resin contacting the fibres. The resin-fibre "sandwich" was then heated at 120° C under a pressure of 350 kPa for 1 minute, the tows thus being impregnated with resin and each group of tows being flattened to a width of 12 mm and a thickness of 0.09 mm.

The upper backing sheet was removed and replaced by a film of poly(vinylidene chloride). This film was made to contact the resin and the ribbons by passage at room temperature through the nip of a pair of soft rubber rollers imparting a pressure of 175 kPa. The poly(vinylidene chloride) film was removed manually. All the excess of resin from between the impregnated tows adhered to this film, leaving a series of parallel ribbons of resin-impregnated carbon fibres on a backing of release material.

These ribbons could be removed and used for filament winding when required.

EXAMPLE 2

Example 1 was repeated but, instead of using groups of 4 tows each of 3000 fibres, there was used a single tow of approximately 10,000 fibres. A gap of about 25 mm was left between each tow, prior to impregnation with resin.

The product was a series of parallel ribbons, each approximately 7 mm wide and 0.125 mm thick.

EXAMPLE 3

Epoxide resin A (80 parts) and Epoxide resin B (80 parts) were heated at 150° C in a Z-blade mixer. When the mixture was homogeneous it was cooled to 100° C and a milled mixture of Epoxide resin A (20 parts), "Aerosil" (5 parts), and dicyandiamide (12 parts) was incorporated ("Aerosil" is a registered Trade Mark and denotes a finely divided silica of large specific surface area). This mixture was cast onto a sheet of polypropylene to leave a film 0.025 mm thick. Tows of carbon fibres were laid onto this film as described in Example 1. A further sheet of polypropylene was laid on top and the "sandwich" was pressed at 80°–100° C under a pressure of 500 kPa. The upper layer of polypropylene was removed and replaced by a layer of kraft paper. This was then passed through rollers at room temperature under a pressure of 200 kPa. Removal of the paper left a series of parallel ribbons each 17 mm in width and 0.05 mm thick on the sheet of polypropylene.

EXAMPLE 4

A mixture of Epoxide A (100 parts), Polysulphone A (70 parts), and boron trifluoride-monoethylamine complex (5 parts) was dissolved in methylene chloride (120 parts), and the solution was used to coat a 400 mm wide strip of silicone-coated release paper. The resin coating was in the form of strips, each strip being approximately 20 mm wide and separated from the next by approximately 15 mm. The paper was then heated in an oven to remove the solvent, the residual strips of resin being 0.03 mm thick.

The supported strips of film were laid, resin side uppermost, on a flat surface and groups of two tows of a commercially-available aromatic polyamide fibre, viz. a poly(p-phenylene terephthalamide), each tow comprising approximately 6000 filaments, were laid unidirectionally on top of the resin and in the centre of each resin strip. A strip of silicone-coated release paper was laid on top of the fibres and the resin-fibre-paper "sandwich" was then heated at 120° under a pressure of 350 kPa for 1 minute. The groups of tows there thus impregnated with the resin and flattened to a width of 15 mm and a thickness of 0.1 mm. The upper strip of release paper was removed and replaced by a film of poly(ethylene terephthalate). The whole was then passed at room temperature through the nip of a pair of soft rubber rollers imparting a pressure of 175 kPa. The poly(ethylene terephthalate) film was removed manually, the excess of resin adhering to this film, leaving a series of parallel ribbons of resin-impregnated aromatic polyamide fibres on a backing of release paper. These ribbons could be removed and used for filament winding when required.

Similar results could be obtained by replacing the tows of the aromatic polyamide fibre by tows of fibres of another polyamide, viz. poly(m-phenylene isophthalamide) or of glass, and the film of poly(ethylene terephthalate) by an aluminum foil.

I claim:

1. A method of preparing ribbons of unidirectional fiber-reinforced plastics material, comprising the steps of
   1. laying unidirectional fibers in a series of spaced discrete parallel strips onto a plastics material on a backing comprising a first continuous sheet of release material,
   2. applying a second continuous sheet of release material to the fibers,
   3. applying heat and pressure such that the plastics material flows about the fibers to form a series of coherent strips,
   4. removing only one of the layers of release material,
   5. applying a continuous solid sheet which will adhere to surplus plastics material between each coherent strip, and
   6. removing the said continuous solid sheet with the surplus plastics material adhering thereto.

2. The method of claim 1, in which the second continuous sheet of release material is coated on the side which contacts the fibers with the same or a different plastics material.

3. The method of claim 1, in which the plastics material comprises at least one thermosettable material.

4. The method of claim 3, in which the thermosettable material is an epoxide resin or a resole.

5. The method of claim 3, in which the plastics material also comprises at least one thermoplastics material.

6. The method of claim 5, in which the plastics material comprises a mixture of
   i. a resole with either a poly(vinyl acetal) or a nylon,
   ii. a novolac with either a neoprene rubber or an acrylonitrile rubber,
   iii. an epoxide resin with a phenoxy resin, or with a copolymer of an α-olefin hydrocarbon and an α-olefin which is an ester of a carboxylic acid, or with a polysulfone.

7. The method of claim 1, in which the plastics material comprises at least one thermoplastics material.

8. The method of claim 4, in which the thermoplastics material is a polysulfone.

9. The method of claim 1, in which the first and second continuous sheets of release material are of polyethylene, polypropylene, or of paper treated with a release agent.

10. The method of claim 1, in which the said continuous solid sheet employed in step (5) is of cotton cloth, nylon, polyester, paper not treated with a release agent, aluminum foil, or poly(vinylidene chloride).

11. The method of claim 1, in which the said plastics material employed in step (1) is in the form of a continuous sheet on the first continuous sheet of release material.

12. The method of claim 1, in which the unidirectional fibers are of carbon or an aromatic polyamide.

* * * * *